(12) United States Patent
Fukushima (10) Patent No.: US 8,947,260 B2
(45) Date of Patent: Feb. 3, 2015

(54) PARKING ASSISTANCE SYSTEM

(71) Applicant: Casio Computer Co., Ltd., Shibuya-ku, Tokyo (JP)

(72) Inventor: Takaaki Fukushima, Tachikawa (JP)

(73) Assignee: Casio Computer Co., Ltd, Tokyo (JP)

( * ) Notice: Subject to any disclaimer, the term of this patent is extended or adjusted under 35 U.S.C. 154(b) by 12 days.

(21) Appl. No.: 13/780,169

(22) Filed: Feb. 28, 2013

(65) Prior Publication Data

US 2013/0222157 A1    Aug. 29, 2013

(30) Foreign Application Priority Data

Feb. 29, 2012 (JP) ................. 2012-043294

(51) Int. Cl.
| | |
|---|---|
| B60Q 1/48 | (2006.01) |
| G08G 1/14 | (2006.01) |
| B60Q 9/00 | (2006.01) |
| B62D 15/02 | (2006.01) |
| G08G 1/017 | (2006.01) |
| G08G 1/04 | (2006.01) |

(52) U.S. Cl.
CPC .............. B60Q 9/002 (2013.01); B62D 15/028 (2013.01); G08G 1/148 (2013.01); G08G 1/0175 (2013.01); G08G 1/04 (2013.01); G08G 1/142 (2013.01); G08G 1/146 (2013.01)
USPC ........................................ 340/932.2; 180/199

(58) Field of Classification Search
CPC ......... G08G 1/14; G08G 1/141; G08G 1/142; G08G 1/146; G08G 1/148; B62D 15/027; B62D 15/028; B62D 15/0275
USPC ........................................ 340/932.2; 180/199
See application file for complete search history.

(56) References Cited

U.S. PATENT DOCUMENTS

| | | | |
|---|---|---|---|
| 7,366,595 B1 * | 4/2008 | Shimizu et al. | 340/937 |
| 7,660,659 B2 * | 2/2010 | Watanabe et al. | 340/435 |
| 8,319,663 B2 * | 11/2012 | Von Reyher et al. | 340/932.2 |
| 8,590,167 B2 * | 11/2013 | Odom | 33/228 |
| 2013/0060421 A1 * | 3/2013 | Kadowaki et al. | 701/36 |

FOREIGN PATENT DOCUMENTS

JP     2007-118878     5/2007

* cited by examiner

*Primary Examiner* — John A Tweel, Jr.
(74) *Attorney, Agent, or Firm* — Amin, Turocy & Watson, LLP

(57) ABSTRACT

A parking assistance system includes a usage status acquisition unit configured to acquire usage status information indicating a usage status at a plurality of parking positions in a parking lot, a moving vehicle information acquisition unit configured to acquire a position of a vehicle moving in the parking lot, a control unit configured to select a parking position for the vehicle in accordance with the usage status information and the position of the vehicle, and transmit guidance image information for guiding the vehicle to the selected parking position, and a projection unit configured to project a guidance image based on the guidance image information onto an inside of the parking lot to present the parking position to the vehicle.

10 Claims, 8 Drawing Sheets

PARKING ASSISTANCE SYSTEM

CROSS-REFERENCE TO RELATED APPLICATIONS

This application is based upon and claims the benefit of priority under 35 USC 119 of Japanese Patent Application No. 2012-043294 filed on Feb. 29, 2012, the entire disclosure of which, including the description, claims, drawings, and abstract, is incorporated herein by reference in its entirety.

BACKGROUND OF THE INVENTION

1. Field of the Invention

The present invention relates to a parking assistance system suitable for an indoor parking lot and the like incidental to, for example, large-scale commercial facilities.

2. Description of the Related Art

There is a parking assistance device configured to simply and quickly move or rotate a target parking frame to an appropriate position. In, for example, Jpn. Pat. Appln. KOKAI Publication No. 2007-118878, a technique is described in which a parking assistance device configured to display a target parking frame on an actual image of a circumference of a vehicle in a superposing manner to thereby set a target parking position at which the vehicle is to be parked, and carry out guidance in how to reach the set target parking position is contrived so that the target parking frame initially displayed on a touch display is moved to a position indicated by a coordinate point designated by a touch operation.

The technique described in the above patent document relates to an on-vehicle device to be provided in each individual vehicle, and configured to carry out guidance display for a parking bay, and hence the technique is not one in which the vacancy of the entire parking lot or the situation of other vehicles is taken into consideration.

Further, display and touch operations are carried out on the touch display unit provided in the vehicle, and hence there is a problem that an amount of movement of the visual line of the driver between the touch display and actual parking position is large, this being liable to lead to an accident.

BRIEF SUMMARY OF THE INVENTION

According to one aspect of the present invention, there is provided a parking assistance system comprising: a usage status acquisition unit configured to acquire usage status information indicating a usage status at a plurality of parking positions in a parking lot; a moving vehicle information acquisition unit configured to acquire a position of a vehicle moving in the parking lot; a control unit configured to select a parking position for the vehicle in accordance with the usage status information and the position of the vehicle, and transmit guidance image information for guiding the vehicle to the selected parking position; and a projection unit configured to project a guidance image based on the guidance image information onto an inside of the parking lot to present the parking position to the vehicle.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of a case where the present invention is applied to an indoor parking system of large-scale commercial facilities or the like will be described in detail with reference to the drawings.

Figure 1:
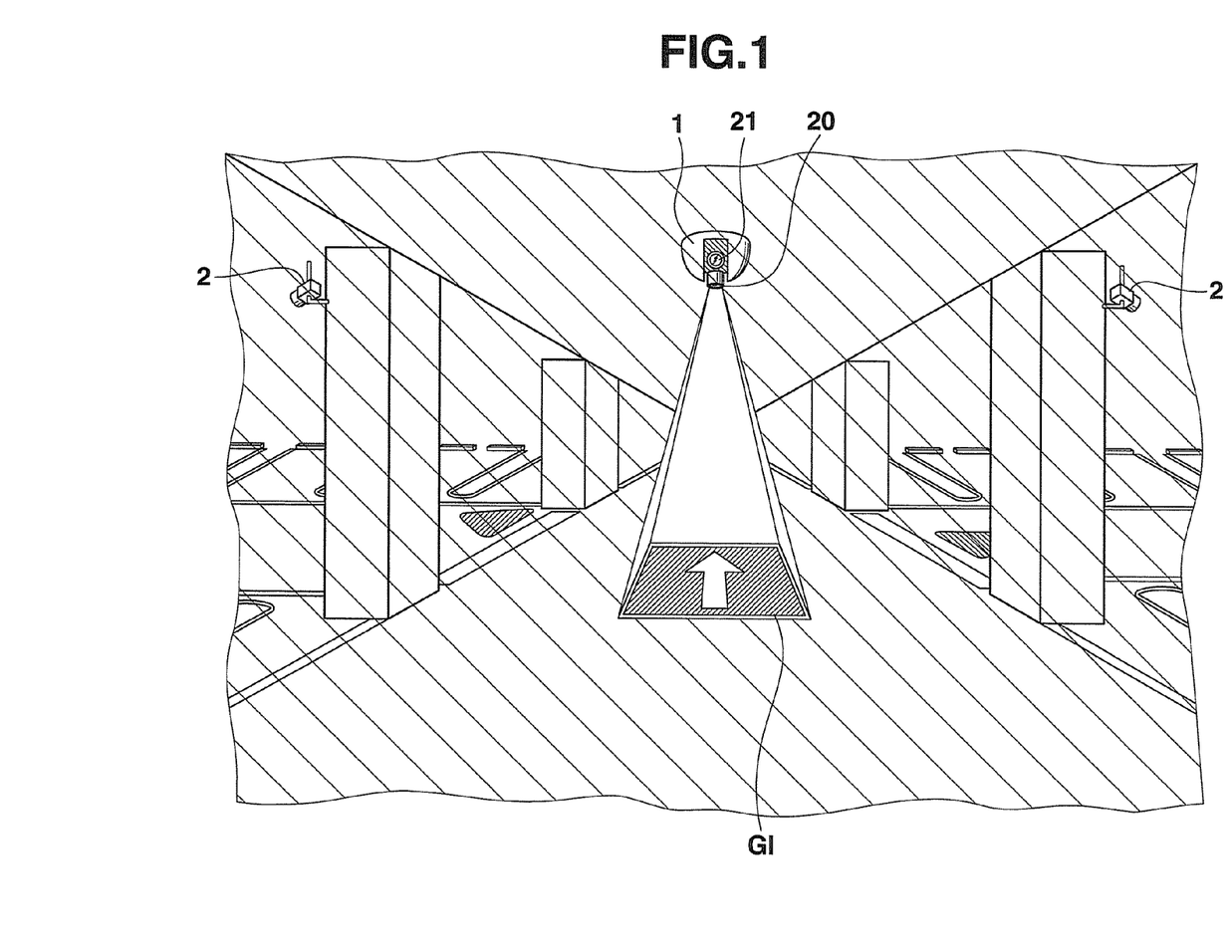
FIG. 1 is a view exemplifying a utilization form of an indoor parking system according to an embodiment.

FIG. 1 is a view showing an example of utilization form according to this system. FIG. 1 shows a scene in a parking lot viewed through a window glass of a vehicle running in a parking lot. At a ceiling part of a position before each intersection in the parking lot, a substantially hemispherical vehicle detection guidance device 1 is installed. The vehicle detection guidance device 1 carries out imaging of a vehicle running through the position at which the device 1 is installed, and projects a guidance image GI of a parking position on the lane road surface or the like for the running vehicle as shown in FIG. 1.

That is, the vehicle detection guidance device 1 is constituted of a moving vehicle information acquisition unit configured to acquire information about a vehicle which is a guiding object by imaging, and a projection unit configured to actually project a guidance image GI.

Further, at, for example, an upper part of each of pillars in the parking lot, a parking-lot on-site camera 2 (usage status acquisition device) configured to image the status of vehicles parked in parking positions is provided. That is, each of the parking-lot on-site cameras 2 acquires usage status information indicating each usage status at each of a plurality of parking positions.

Each of both the vehicle detection guidance device 1 and parking-lot on-site camera 2 is provided with a motor-driven platform. Regarding the vehicle detection guidance device 1, the imaging direction of a running vehicle, and projection direction of a guidance image GI can be changed by driving the motor-driven platform. Likewise, regarding the parking-lot on-site camera 2 the imaging direction of each parking position can be changed within each assigned range by driving the motor-driven platform.

Both the vehicle detection guidance device 1 and parking-lot on-site camera 2 are wireless-connected to each other by using a wireless LAN technique conforming to, for example, the IEEE 802.11n standard.

Figure 2:
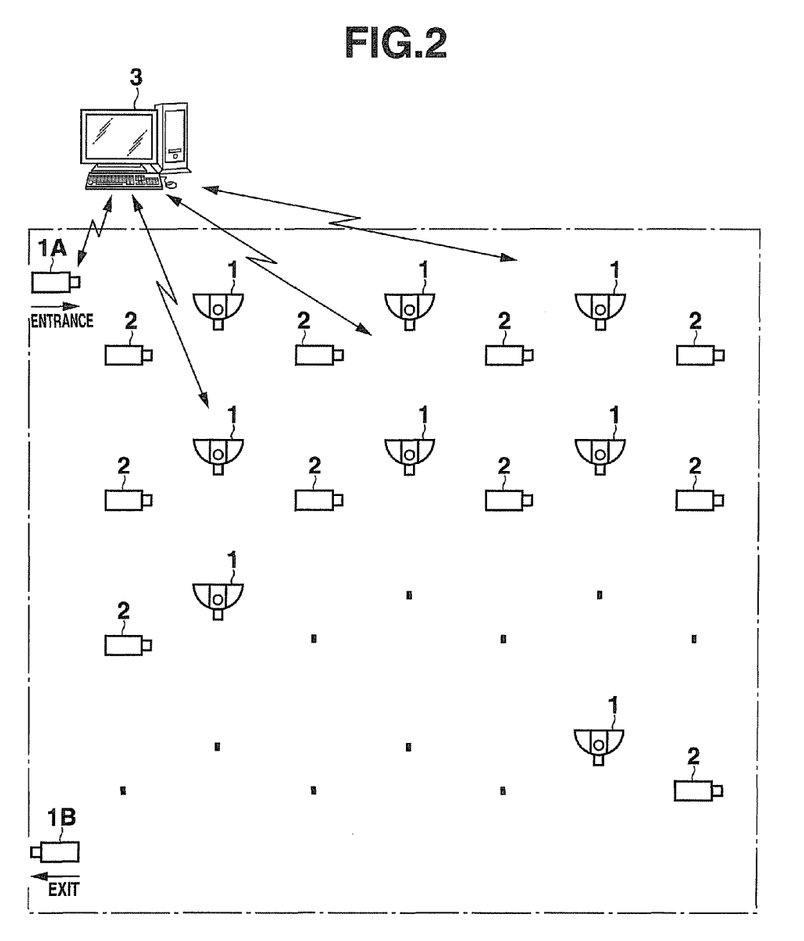
FIG. 2 is a view showing the device configuration of the indoor parking system according to the embodiment.

FIG. 2 is a conceptual view showing the device configuration of this system. A server device 3 constituted of a database server is wireless LAN-connected to a client device group constituted of the vehicle detection guidance devices 1 and parking-lot on-site cameras 2 and performs overall control on the client device group.

As described above, the vehicle detection guidance device 1 is provided at the ceiling part of the position before each intersection in the parking lot. Further, the cameras 2 are arranged such that imaging ranges are assigned to the parking-lot on-site cameras 2 so that all the parking positions in the parking lot are covered.

Furthermore, at an entrance and exit of the parking lot, moving vehicle cameras 1A and 1B each of which is configured to image a rear side image of a passing vehicle are also provided as auxiliary devices of the vehicle detection guidance devices 1.

It should be noted that assuming that the hardware configuration itself of the server device 3 is substantially identical to the general database server or the like, an illustration and description thereof are omitted.

Figure 3:
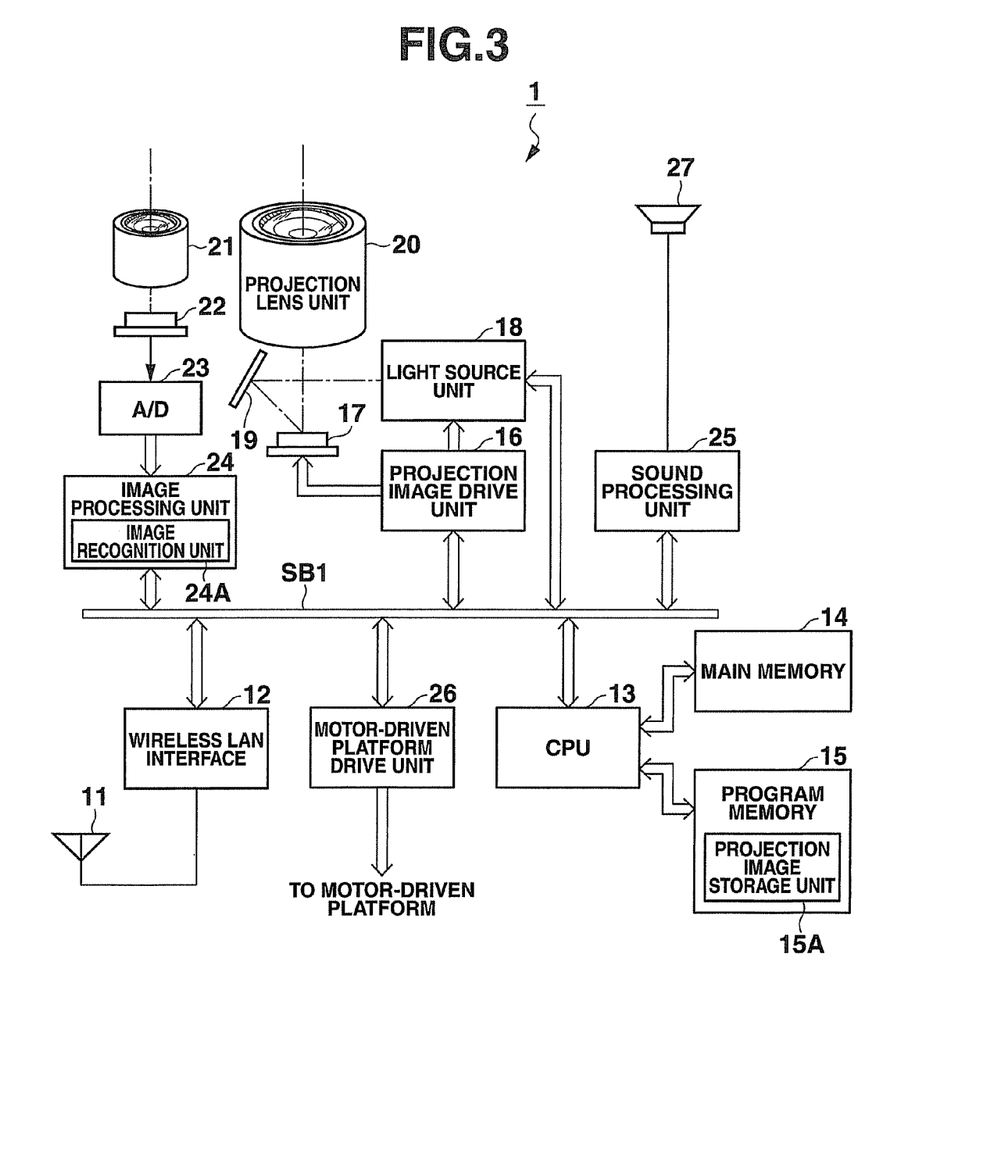
FIG. 3 is a block diagram explaining the functional configuration of an electronic circuit of a vehicle detection guidance device according to the embodiment.

FIG. 3 is a view explaining the functional configuration mainly of an electronic circuit of the vehicle detection guidance device 1.

In FIG. 3, image code information (guidance image information) is input by wireless from the server device 3 through a wireless LAN antenna 11 and wireless LAN interface 12.

The wireless LAN interface 12 is an interface circuit conforming to, for example, the IEEE 802.11n standard, and controls wireless transmission/reception of data to/from the server device 3 through the wireless LAN antenna 11 under the control of a CPU 13 to be described later.

The image code information input from the wireless LAN interface 12 is sent to the CPU 13 through a system bus SB1. The CPU 13 controls all operations in the vehicle detection guidance device 1. The CPU 13 is directly connected to a main memory 14 and program memory 15. The main memory 14 is constituted of, for example, an SRAM, and functions as a work memory of the CPU 13. The program memory 15 is constituted of an electrically rewritable nonvolatile memory, such as a flash ROM, and stores therein an operation program to be executed by the CPU 13, various standardized data items, and the like.

A projection image storage unit 15A is included in the program memory 15 as shown in FIG. 3. The projection image storage unit 15A stores therein a large number of projection image information items corresponding to the image code information sent from the server device 3.

The CPU 13 reads the operation program, standardized data, and the like stored in the program memory 15, develops and stores the read program, data, and the like in the main memory 14, and executes the program to thereby perform overall control on the vehicle detection guidance device 1.

The CPU 13 reads corresponding projection image information from the projection image storage unit 15A based on image code information sent from the server device 3, and transmits the projection information to a projection image drive unit 16.

The projection image drive unit 16 display-drives a micromirror element 17 by higher time-division drive obtained by multiplication of a frame rate based on a predetermined format, for example, 60 [frames/s], division number of a color component, and display gradation number.

The micromirror element 17 individually subjects inclination angles of a plurality of minute mirrors corresponding to, for example, WXGA (1280 vertical pixels×768 horizontal pixels) arranged in an array form to on/off operations at a high speed to carry out a display operation, thereby forming a light figure by the reflection light from the minute mirrors.

On the other hand, primary-color light components of red, green, and blue are cyclically emitted from a light source unit 18 by time division. The light source unit 18 includes LEDs which are semiconductor light emitting elements, and repetitively emits primary light components of red, green, and blue by time division. The LEDs included in the light source unit 18 may include an LD (semiconductor laser), and organic electroluminescent element as the LED in a broad sense. The primary light component from the light source 18 is totally reflected from a mirror 19, and is applied to the micromirror element 17.

Further, a light figure is formed by the reflected light from the micromirror element 17, and the formed light figure is projected to the outside through a projection lens unit 20, and is displayed. The projection lens unit 20 includes a focusing lens configured to move a focus position in the internal lens optical system.

Further, an imaging lens unit 21 is arranged adjacent to the projection lens unit 20. The imaging lens unit 21 includes a focusing lens configured to move a focus position. The external light figure incident on the imaging lens unit 21 is image-formed on a CMOS image sensor 22 which is a solid-state image sensing element.

An image signal obtained by the image formation on the CMOS image sensor 22 is digitized by an analog-to-digital converter 23, and is thereafter sent to an image processing unit 24.

The image processing unit 24 scan-drives the CMOS image sensor 22 to cause the image sensor 22 to carry out an imaging operation. Further, the image processing unit 24 carries out image processing such as contour extraction, image recognition, and the like of the image data obtained by the imaging by means of an image recognition unit 24A included in the image processing unit 24. In this way, as will be described later, by carrying out determination as to whether or not a vehicle is captured in the image, analysis of the license plate part of a case where a vehicle is captured in the image, and the like, information about the license plate serving as identification information of the vehicle is acquired.

Presence/absence of a vehicle, and an analysis result of the license plate part of a case where the vehicle is present which are obtained by the image processing unit 24 are transmitted to the server device 3 side through the wireless LAN interface 12, wireless LAN antenna 11 by the control of the CPU 13.

The CPU 13 is further connected to a sound processing unit 25, and motor-driven platform drive unit 26 through the system bus SB1.

The sound processing unit 25 is provided with a sound source circuit such as a PCM sound source or the like. Further, the sound processing unit 25 converts a sound signal sent from the server device 3 side through the wireless LAN antenna 11 into analog data, drives a speaker unit 27 to cause the unit 27 to emit sound or guidance voice or the like as the need arises.

The motor-driven platform drive unit 26 drives the motor-driven platform (not shown) based on operation information about the motor-driven platform transmitted from the server device 3 side to the CPU 13 through the wireless LAN antenna 11, wireless LAN interface 12, and system bus 1 under the control of the CPU 13. In this way, the motor-driven platform drive unit 26 varies the projection direction of the projection lens unit 20, and imaging direction of the imaging lens unit 21.

Next, the functional configuration mainly of an electronic circuit of each of moving vehicle cameras 1A and 1B serving as auxiliary devices of the parking-lot on-site cameras 2, and vehicle detection guidance devices 1 will be described below by using FIG. 4.

Figure 4:
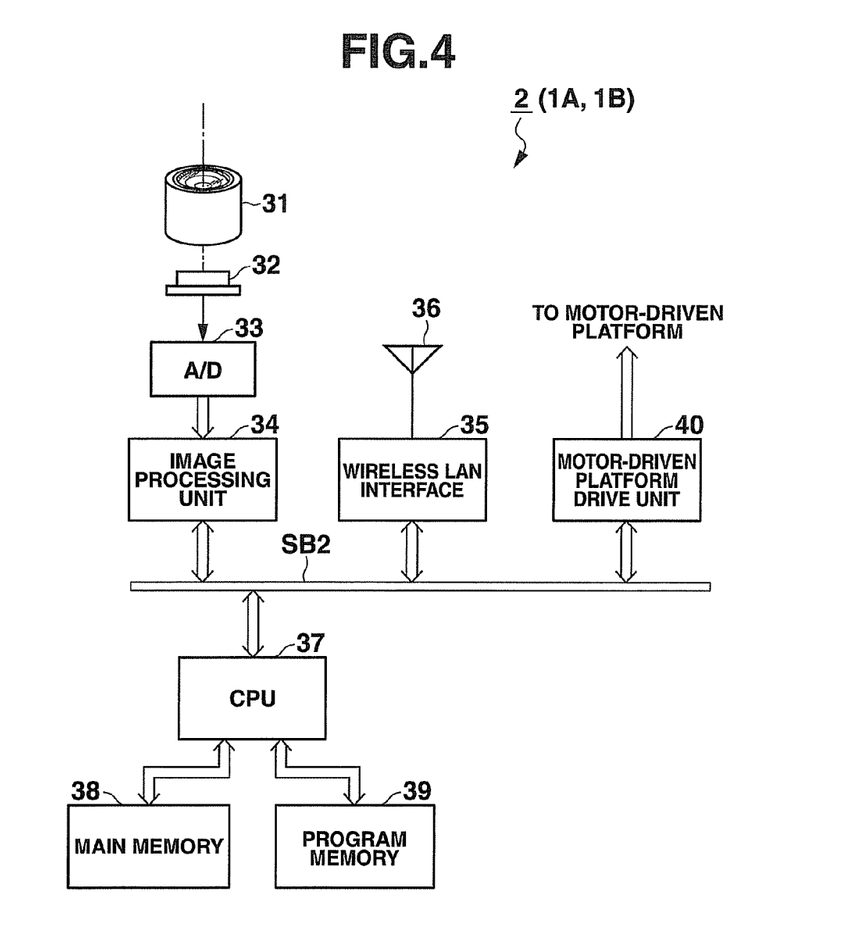
FIG. 4 is a block diagram explaining the functional configuration of an electronic circuit of a parking-lot on-site camera according to the embodiment.

In FIG. 4, a reference symbol 31 denotes an imaging lens unit. The imaging lens unit 31 includes a focusing lens configured to move a focus position. External light figure incident on the imaging lens unit 31 is image-formed on a CMOS image sensor 32 which is a solid-state image sensing element.

An image signal obtained by the image formation on the CMOS image sensor 32 is digitized by an analog-to-digital converter 33, and is thereafter sent to an image processing unit 34.

The image processing unit 34 scan-drives the CMOS image sensor 32 to cause the image sensor 32 to carry out an imaging operation and, then subjects the image data obtained by the imaging to data compression in a predetermined format in conformity with, for example, joint photographic experts group (JPEG) to thereby form the image data into a data file. Further, the image processing unit 34 sends the obtained image data file to a wireless LAN interface 35 through a system bus SB2. In the wireless LAN interface 35, the image data file sent thereto from the image processing unit 34 is transmitted to the server device 3 through the wireless LAN antenna 36.

A CPU 37 controls all the operations of the above circuits through the system bus SB2. The CPU 37 is directly connected to a main memory 38 and program memory 39. The main memory 38 is constituted of, for example, an SRAM, and functions as a work memory of the CPU 37. The program memory 39 is constituted of an electrically rewritable non-volatile memory, for example, a flash ROM, and stores therein an operation program to be executed by the CPU 37, various standardized data items, and the like.

The CPU 37 reads the operation program, standardized data, and the like stored in the program memory 39, develops and stores the read program, data, and the like in the main memory 38, and executes the program to thereby perform overall control on the parking-lot on-site cameras 2.

The CPU 37 is further connected to a motor-driven platform drive unit 40 through the system bus SB2.

The motor-driven platform drive unit 40 drives a motor-driven platform (not shown) under the control of the CPU 37 to thereby vary the imaging direction of the imaging lens unit 31.

Next, operations of the embodiment will be described below.

Figure 5:
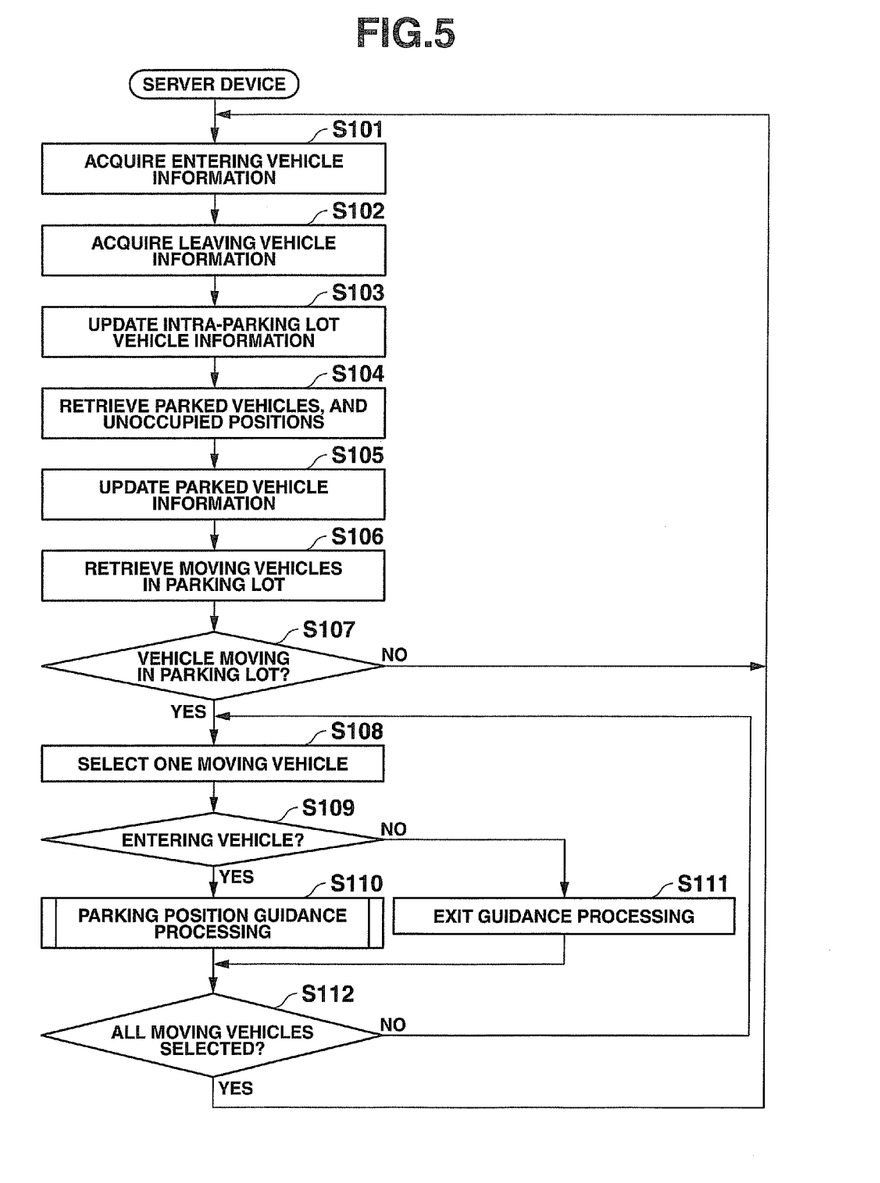
FIG. 5 is a flowchart showing the items of a main routine to be processed by a server device according to the embodiment.

FIG. 5 shows overall processing items to be executed by the server device 3. In FIG. 5, first, rear side image information about an entering vehicle to be obtained from moving vehicle camera 1A provided at the entrance of the parking lot is acquired (step S101).

In the server device 3, the license plate part is extracted from the image information, and character content in the license plate part such as characters, numerals, and the like are recognized and, on the other hand, whether or not there exists a wheelchair mark which is an international access symbol indicating that there is at least a physically disabled passenger or a cloverleaf mark which is a physically disabled person mark indicating a vehicle driven by a physically disabled person is also determined by image processing, whereby information about the license plate, and information indicating presence/absence of a physically disabled person mark are accumulated.

It should be noted that whether or not there is a physically disabled person in the vehicle may not be determined only by presence/absence of a wheelchair mark or a cloverleaf mark. For example, whether or not there is a physically disabled person in the vehicle may be determined based on presence/absence of a sticker, flag, car accessories or the like by which it can be presumed that there is a physically disabled person in the vehicle.

There is a case where a physically disabled person mark and the like are not provided on the front and rear of a vehicle, but are provided on, for example, the lateral sides of a vehicle. A configuration in which a plurality of moving vehicle cameras 1A are provided by also taking such a situation into consideration, and the whole surface, i.e., front, rear, and lateral surfaces of the entering vehicle are imaged by using moving vehicle cameras 1A, whereby image information about the whole surface of the entering vehicle is acquired may be employed.

In the above embodiment, presence/absence of a physically disabled person mark is determined on the server device 3 side by image processing based on the image information about the rear side of the entering vehicle acquired from moving vehicle camera 1A. However, the present invention is not limited to this, and presence/absence of a physically disabled person mark may be determined on moving vehicle camera 1A side by image processing, and the determination result may be transmitted to the server device 3.

Subsequently, in the server device 3, image information about the rear side of a leaving vehicle to be obtained from moving vehicle camera 1B provided at the exit of the parking lot is acquired (step S102).

In the server device 3, the license plate part is extracted from the image information, and character content in the license plate part such as characters, numerals, and the like are recognized by image processing.

Information about the left vehicle is deleted based on the image information items about the entering vehicle and leaving vehicle obtained in steps S101 and S102, whereby the content of the intra-parking lot vehicle information correlated with the license plate information about vehicles existing in the parking lot at that point of time, and information indicating presence/absence of a physically disabled person mark are updated and set (step S103).

Subsequently, by using all the parking-lot on-site cameras 2 in the parking lot, and by operating the motor-driven platforms as the need arises, images of all the parking positions are sequentially captured. That is, images of all the parking positions are sequentially captured by operating all the motor-driven platforms so that all the images of the parking positions corresponding to all the parking-lot on-site cameras 2 in the parking lot can be captured. Further, first, in the parking positions in the parking lot, unoccupied positions at which no vehicles are parked are retrieved based on, for example, the extraction result of images of license plate parts (step S104).

Furthermore, based on the result of extraction of images of the license plate parts obtained at the parking positions in the parking lot, information about positions at which vehicles are parked, and vehicle information at the positions are updated and stored as parked vehicle information (step S105).

Next, all the moving vehicles are retrieved based on the analysis result of the license palate parts by using all the vehicle detection guidance devices 1 in the parking lot (step S106). Here, each of the vehicle detection guidance devices 1 can carry out analysis of the license plate part when the vehicle is captured by the image recognition unit 24A of the image processing unit 24 as described above. The server device 3 acquires the analysis result of the license plate part of the moving vehicle sent from each of the vehicle detection guidance devices 1 and thereafter carries out the retrieval described above.

Based on the retrieval result, the server device 3 determines whether or not there is a vehicle moving in the parking lot (step S107).

Here, when it is determined by the server device 3 that there is no vehicle moving in the parking lot, the flow is returned to the processing starting from step S101, and the same processing is repeated again.

Further, it is assumed that it is determined in step S107 that there is a vehicle moving in the parking lot. In that case, first, the server device 3 selects one vehicle for which it has been determined by the server device 3 that the vehicle is moving (step S108). Further, it is determined whether or not the selected vehicle is an entering vehicle to be parked at one of the parking positions by referring to the history of the parked vehicle information updated in step S105, and based on presence/absence of the identical license plate information (step S109).

When the identical license plate information is not present in the history of the parked vehicle information, and it is determined that the vehicle is an entering vehicle to be parked, the server device 3 determines a recommendable parking position, and causes a corresponding vehicle detection guidance device 1 to execute guidance processing in order to guide the moving vehicle to the parking position (step S110).

Further, it is assumed that in step S109 the identical license plate information is present in the history of the parked vehicle information, and it is determined that the vehicle is a leaving vehicle which has finished parking and is going to exit from the parking lot. In that case, in order to guide the moving vehicle to the exit of the parking lot, the server device 3 transmits code information of a guidance image indicating the direction to the exit together with operation information of the motor-driven platform to a corresponding vehicle detection guidance device 1, the guidance image being determined in advance vehicle in accordance with a position of each vehicle detection guidance device 1, thereby causing the corresponding vehicle detection guidance device 1 to execute guidance processing (step S111).

After instructing the corresponding vehicle detection guidance 1 to execute guidance processing for the entering vehicle or the leaving vehicle by the processing of step S110 or step S111, the server device 3 determines whether or not still there is any other moving vehicle for which guidance processing should be carried out (step S112).

Here, when it is determined that still there is a moving vehicle for which guidance processing has not been carried out, the flow is again returned to the processing from step S108, and the same guidance processing for the entering vehicle or the leaving vehicle is repeated the number of times corresponding to the number of vehicles.

Further, after carrying out guidance processing of steps S108 to S112 necessary for all the moving vehicles present in the parking lot, and at a point of time at which moving vehicles to be guided have become absent, such a situation is confirmed in step S112, and the flow is returned to the processing starting from step S101.

Figure 6:
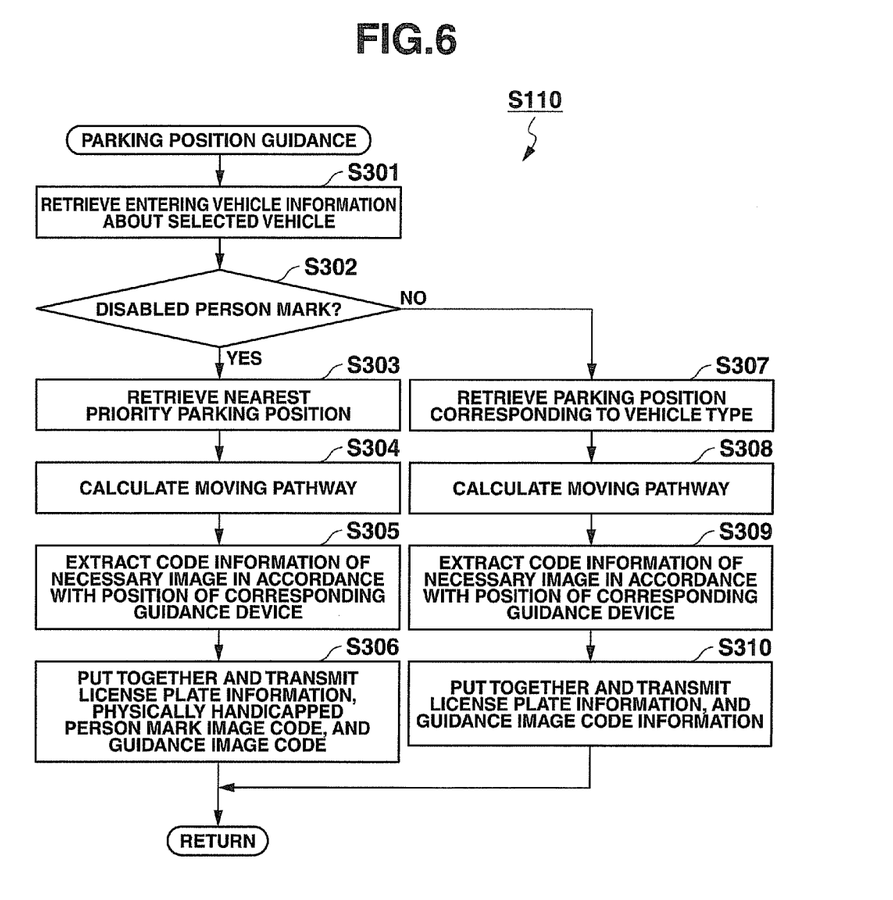
FIG. 6 is a flowchart showing a subroutine of parking position guidance to be processed by the server device according to the embodiment.

FIG. 6 is a subroutine showing detailed content of guidance processing of step S110 for the entering vehicle. In FIG. 6, the server device 3 first retrieves information for entry associated with the selected vehicle (step S301).

The server device 3 determines whether or not information indicating presence of a physically disabled person mark is stored in correlation with license plate information in the retrieved vehicle information (step S302).

Here, when it is determined that information indicating presence of a physically disabled person mark is not stored, the server device 3 classifies the entering vehicle as one of vehicle types, specifically, large-sized passenger vehicle, ordinary passenger vehicle, small-sized passenger vehicle, and light vehicle based on information about classification number obtained from the license plate information, and retrieves an unoccupied position for the corresponding vehicle type (step S307). It should be noted that the vehicle type may not be determined only from the license plate information, but may be determined from the size of the vehicle based on the vehicle information itself.

Further, based on the retrieved parking position, and current position of the entering vehicle, the shortest moving pathway is calculated by taking the regular traveling route in the parking lot into consideration (step S308). Further, in accordance with the calculated moving pathway, and position of the corresponding vehicle detection guidance device 1, code information of an image necessary for guidance is extracted (step S309).

Further, the license plate information of the vehicle, and the extracted code information of the necessary image are put together in accordance with a predetermined data format, and the result is transmitted to the corresponding vehicle detection guidance device 1 (step S310), whereby the subroutine is terminated, and the flow is returned to the main routine of FIG. 5.

Further, when it is determined in step S302 that information indicating presence of a physically disabled person mark is stored in correlation with license plate information in the retrieved vehicle information, the server device 3 retrieves a nearest unoccupied priority parking position for the physically disabled person (step S303).

Further, based on the retrieved parking position, and current position of the vehicle, the shortest moving pathway is calculated by taking the regular traveling route in the parking lot into consideration (step S304). Further, in accordance with the calculated moving pathway, and position of the corresponding vehicle detection guidance device 1, code information of an image necessary for guidance is extracted (step S305).

Further, the license plate information of the vehicle, code information of an image of a mark indicating a physically disabled person, and the extracted code information of the necessary image are put together in accordance with a predetermined data format, and the result is transmitted to the corresponding vehicle detection guidance device 1 (step S306), whereby the subroutine is terminated, and the flow is returned to the main routine of FIG. 5.

In addition to the operation on the server device 3 side described above, an operation on the vehicle detection guidance device 1 side configured to receive code information of the image will be described below.

Figure 7:
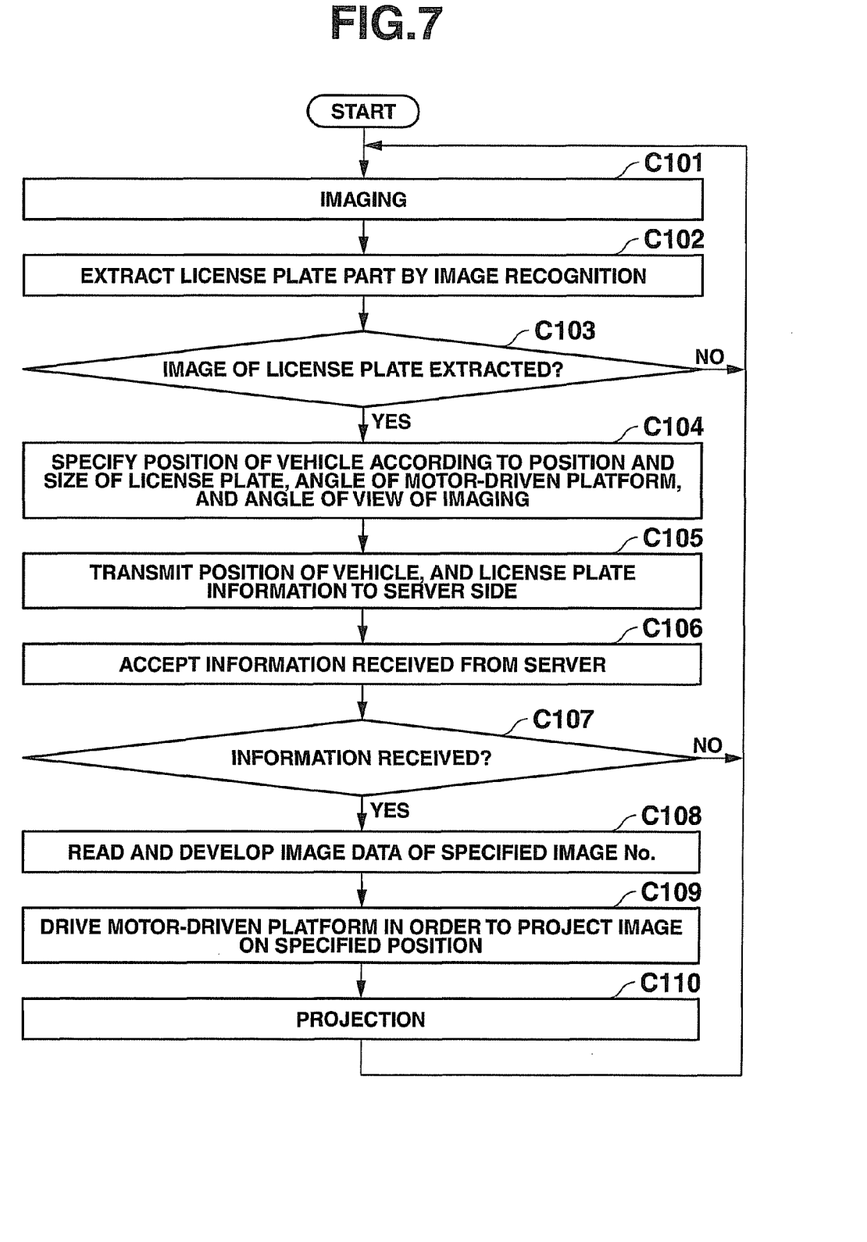
FIG. 7 is a flowchart showing the items to be processed by the vehicle detection guidance device according to the embodiment.

FIG. 7 is a flowchart showing a sequence of processing items to be executed by each of the vehicle detection guidance devices 1. At the beginning of the processing, the CPU 13 in the vehicle detection guidance device 1 automatically carries out shooting of images in the direction of the upstream side of the regular traveling route in the parking lot from the position at which the device 1 is installed by using the CMOS image sensor 22 periodically, for example, at time intervals of one second (step C101). Further, with respect to the obtained image data, a license plate part is extracted by the image recognition unit 24A of the image processing unit 24 (step C102).

It is determined by the CPU 13 whether or not an image of the license plate part could have been extracted as a result of the extraction (C103). Here, when it is determined that no image of the license plate part could have been extracted, it is assumed that no moving vehicle is present at a position under the charge of the vehicle detection guidance device 1, and the flow is returned again to the processing starting from step C101.

Further, when it is determined in step C103 that an image of the license plate part could have been extracted, the CPU 13 assumes that a moving vehicle is present at the corresponding position, and specifies the front position of the moving vehicle in accordance with a position and size of the license plate part extracted from the acquired image, posture angle of the motor-driven platform, and angle of view of the imaging lens unit 21 which are set by the motor-driven platform drive unit 26 at that point of time (step C104).

Subsequently, the specified position of the vehicle, and extracted license plate information are put together in accordance with a predetermined data format, and the result is transmitted to the server device 3 side by wireless through the wireless LAN interface 12, and wireless LAN antenna 11 (step C105).

Image code information configured to project a guidance image GI sent from the server device 3 side in response to the data transmission is accepted for a fixed time (step C106). After that, it is confirmed on the vehicle detection guidance device 1 side whether or not code information of the image has actually been received (step C107).

Here, when it is determined that no code information of the image from the server device 3 could have been received, the flow is returned to the processing starting from step C101, and the same processing is repeated.

Further, having confirmed in step C107 reception of the code information of the image from the server device 3, the CPU 13 reads, based on the received code information, corresponding image data from the projection image storage unit 15A of the program memory 15, and develops the read image data on the main memory 14, and stores the data therein (step C108).

Subsequently, when operation information of the motor-driven platform is sent from the server device 3 together with the code information of the image, the CPU 13 drive-controls the motor-driven platform by using the motor-driven platform drive unit 26 based on an operation signal of the operation information (step C109). After that, the CPU 13 causes the projection image drive unit 16 to display the image by using the micromirror element 17 based on the image developed and stored in the main memory in step C108, and project the image on the road surface or the like in front of the object vehicle from the projection lens unit 20 (step C110).

Thereby, it is assumed that a processing sequence has been completed once, the flow returns to the processing starting from step C101 while the current image projection state is maintained until the next image projection instruction is issued.

Figure 8:
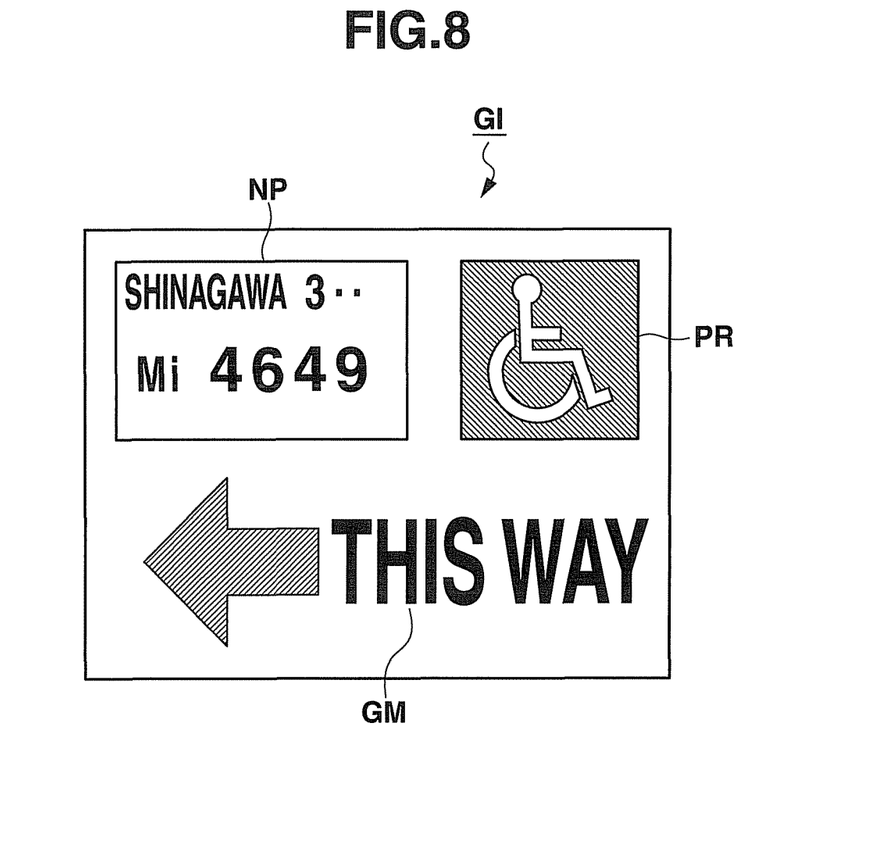
FIG. 8 is a view exemplifying the content of a guidance image projected by the vehicle detection guidance device according to the embodiment.

FIG. 8 shows an example of a guidance image GI to be projected at this time on the road surface or the like positioned in front of the moving vehicle. This guidance image GI is constituted of a license plate image NP, physically disabled person mark PR, and guidance message image GM.

Regarding the license plate image NP, the content of the license plate part of the vehicle which is the guidance object of the guidance image GI are projected as they are, and the guidance image GI is an image intended for the purpose of preventing other vehicles from moving to the parking position in accordance with this guidance image GI.

As the physically disabled person mark PR, the wheelchair mark, which is the international access symbol is used as it is, and the mark PR indicates that a physically disabled person is riding in the vehicle or that the vehicle driven by a physically disabled person is being guided to a priority parking position.

The guidance message image GM is configured to indicate the specific guidance content for the corresponding vehicle and, here a case where the guidance is given such that the vehicle is guided by a leftward arrow and alphabet character string indicating "this way" to turn to the left at the nearest intersection position along the advancing route in the parking lot is shown.

It should be noted that in addition to the above, it goes without saying that setting may be made so that guidance images and information items which are desired by the administrator of this parking assistance system can freely be projected. For example, a configuration in which when a vehicle advances along a route deviating from the guidance direction, the driver is informed that the vehicle is out of the guidance route or a configuration in which in case of emergency such as fire, it is informed that a state of emergency has arisen by using all the vehicle detection guidance devices 1 provided in the parking lot may also be employed.

As described above, the present invention is configured such that an image is not displayed on a display device, and a guidance image GI indicating the specific guidance content are projected for the vehicle by using a projection unit, and the place on which the guidance image GI describing the guidance content is to be projected can variably be moved. Accordingly, a configuration in which as the vehicle moves, the guidance image GI is continued to be unceasingly projected on the road surface in front of the vehicle can also be set.

For example, in the configuration in which a display device is fixed to a predetermined position of the road or the wall, when the vehicle has passed the image, when the vehicle has moved to a position from which the image can hardly be seen, or when the driver has overlooked the image, it becomes necessary for the driver to have another look of the display, or to move to a position at which the display can be seen for confirmation of the guidance image GI. However, by virtue of the configuration of this embodiment, the guidance image GI is projected on the road surface in front of the vehicle at all times, and hence the driver can continue to securely observe the guidance image GI.

Further, the guidance image GI is projected on the road surface in front of the vehicle at all times, whereby the driver can reduce the visual line movement amount when the driver watches the guidance image GI, and can drive safely.

As has been described above in detail, according to this embodiment, each of the users of the parking lot need not provide any device or the like in the user's own vehicle, and it becomes possible to guide a vehicle to a parking position more safely and appropriately.

Further, in the above embodiment, the configuration in which the guidance image is projected on the road surface or the like in front of the object vehicle is employed, and hence it is possible for the driver to reduce the visual line movement amount when the driver watches the guidance image GI, and drive safely.

Furthermore, in the above embodiment, the size of the vehicle is determined based on the classification number included in the read license plate information and, thereafter the corresponding unoccupied position is retrieved. By making it possible to select a parking position for a vehicle of the corresponding size based on the classification number in the license plate as described above, or in consideration of the size of the license plate itself if the need arises, it is possible to increase the utilization efficiency of the parking lot.

Further, in the above embodiment, particularly in a parking lot in which parking positions for physically disabled persons are present, guidance for the corresponding vehicle is carried out by automatic determination, and hence it is possible to further reduce the burden of the vehicle in which a physically disabled person rides, or the vehicle driven by a physically disabled person associated with parking.

Furthermore, in the above embodiment, a vehicle detection guidance device 1 formed by integrating a device configured to acquire information concerning a moving vehicle which is the guidance object by imaging, and device configured to actually project a guidance image GI with each other into one device is used, and hence it is possible to further simplify the system configuration and control thereof.

Although in the above embodiment, the description has been given by assuming that whether or not a vehicle is present at each parking position is determined by acquisition of an image, in the case of a locking type parking system using flap plates, it is not necessary to acquire presence/absence of parking as image information except for acquisition of information concerning the license plate part, and it is possible to acquire information indicating presence/absence of a parked vehicle more directly.

Further, in the above embodiment, each of moving vehicle cameras 1A and 1B acquires a rear side image of a passing vehicle, and acquires rear side image information on an entering vehicle to thereby recognize characters or the like in the license plate part. However, the above embodiment is not limited to the above, each of moving vehicle cameras 1A and 1B may acquire a front side image of a passing vehicle, and may acquire a front side image information on an entering vehicle to thereby recognize characters or the like in the license plate part. Further, each of moving vehicle cameras 1A and 1B may acquire a front side image, and rear side image of a passing vehicle to thereby recognize characters or the like in the license plate part by using both the images.

In the case where the configuration in which both the front side image and rear side image of a passing vehicle are acquired is employed, even when one of the front side image and rear side image of the passing vehicle cannot be recognized, if the other of the images can be recognized, it is possible to continue guidance of the vehicle.

Although in the above embodiment, when it is determined that there is a physically disabled person mark on a moving vehicle in the parking lot, the server device 3 retrieves a nearest unoccupied priority parking position for the physically disabled person, the embodiment is not limited to the above. For example, a configuration in which when it is determined that there is a beginner mark which is a beginner driver sign indicating a vehicle driven by a beginner on an entering vehicle, a parking position adjacent to an unoccupied parking position at which no vehicle is parked, i.e., one of two or more contiguous unoccupied parking positions is retrieved, and the vehicle is guided toward the retrieved parking position may be employed.

By employing such a configuration, it is possible to reduce the necessity for paying attention to other vehicles as compared with a case where a vehicle is to be parked at a position adjacent to an occupied parking position at which a vehicle is parked, and hence even a beginner vehicle driver can easily park a vehicle in the parking lot.

It should be noted that whether or not a beginner driver rides in a vehicle may not be determined only according to presence/absence of a beginner driver mark. For example, it may be determined whether or not a vehicle is driven by a beginner based on presence/absence of a sticker, flag, car accessories or the like by which it can be presumed that the vehicle is driven by a beginner.

Further, for example, a configuration in which when it is determined that there is a senior driver mark which is a senior driver sign indicating a vehicle driven by a senior driver is on an entering vehicle, a parking position adjacent to the gateway of the parking lot or, for example, a parking position close to the gateway of commercial facilities adjacent to the parking lot is retrieved, and the vehicle is guided toward the retrieved parking position may be employed.

By employing the configuration in which a vehicle driven by a senior driver is parked at a parking position close to the gateway, it is possible to shorten the walking distance to the gateway, and provide a parking position determined in consideration of the senior driver.

It should be noted that whether or not there is a senior driver in a vehicle may not be determined only according to presence/absence of a senior driver sign. For example, it may be determined whether or not a vehicle is driven by a senior driver based on presence/absence of a sticker, flag, car accessories or the like by which it can be presumed that the vehicle is driven by a senior driver.

Furthermore, by assuming a case where the beginner driver sign, senior driver sign, and the like are not provided on the front and rear of a vehicle, but are provided on, for example, the lateral sides of a vehicle, a configuration in which the whole surface, i.e., front, rear, and lateral surfaces of the entering vehicle are imaged by using a moving vehicle camera 1A, whereby image information about the whole surface of the entering vehicle is acquired may be employed.

Furthermore, a case where a vehicle is entering the parking lot at night or the like with headlights and taillights thereof on is assumed. In that case, it is conceivable that overexposure (or blown-out highlights) occurs in an image acquired by each of moving vehicles cameras 1A and 1B, and all the vehicle detection guidance devices 1 because of light emitted from the vehicle, and license plate information, and information indicating presence/absence of a physically disabled person mark cannot be read.

In consideration of such a situation, a configuration in which a flashlight is provided in each of moving vehicle cameras 1A and 1B, all the vehicle detection guidance devices 1 and an object vehicle is irradiated with light while moving vehicle camera 1A carries out imaging of the object vehicle in the nighttime or a configuration in which image information acquired by moving vehicle camera 1A in the nighttime is subjected to image correction such as exposure compensation or the like may be employed.

By employing such a configuration, it is possible to securely read license plate information, and information indicating presence/absence of a physically disabled person mark.

Although in the embodiment described above, image code information is input to the vehicle detection guidance device 1 from the server device 3, and corresponding image data is read from the projection image storage unit 15A of the program memory 15 based on the input image code information, a configuration in which various image information items themselves such as JPEG and the like are input as they are from the server device 3 to the vehicle detection guidance device 1 may also be employed.

Further, although in the above embodiment, the configuration in which a guidance image is continued to be unceasingly projected on the road surface in front of the vehicle is employed, a configuration in which the guidance image is projected on the wall of the parking lot or on the pillar part or a configuration in which position information about the hood part of the vehicle is acquired by the vehicle detection guidance device 1 and the guidance image is unceasingly projected on the hood part may also be employed as another choice.

Furthermore, although in the embodiment described above, each of the parking-lot on-site cameras 2 images the situation of a vehicle parked at each parking position, a configuration in which one parking-lot on-site camera collectively images a plurality of parking positions may also be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A parking assistance system comprising:
   a usage status acquisition unit configured to acquire usage status information indicating a usage status at a plurality of parking positions in a parking lot;
   a moving vehicle information acquisition unit configured to acquire a position of a vehicle moving in the parking lot;
   a control unit configured to select a parking position for the vehicle in accordance with the usage status information and the position of the vehicle, and transmit guidance image information for guiding the vehicle to the selected parking position; and
   a projection unit configured to project a guidance image based on the guidance image information onto an inside of the parking lot to present the parking position to the vehicle.

2. The parking assistance system according to claim 1, wherein
   the moving vehicle information acquisition unit further specifies a front position of the vehicle, and
   the projection unit projects the guidance image on a road surface in front of the vehicle based on the front position of the vehicle.

3. The parking assistance system according to claim 1, wherein
   the moving vehicle information acquisition unit further specifies a position of a hood part of the vehicle, and
   the projection unit projects the guidance image on the hood part of the vehicle.

4. The parking assistance system according to claim 1, wherein
   the moving vehicle information acquisition unit further acquires identification information, and
   the control unit selects the parking position for the vehicle in accordance with the identification information.

5. The parking assistance system according to claim 4, wherein
   the moving vehicle information acquisition unit acquires license plate information about the vehicle as the identification information.

6. The parking assistance system according to claim 4, wherein
   the moving vehicle information acquisition unit acquires a size of the vehicle as the identification information, and
   the control unit selects the parking position for the vehicle corresponding to the size of the vehicle.

7. The parking assistance system according to claim 4, wherein
   parking positions exclusively used for disabled persons are present in the parking lot,
   the vehicle information acquisition unit acquires information indicating whether or not a disabled person rides in the vehicle as part of the identification information, and
   the control unit selects, when information indicating that the disabled person rides in the vehicle is included in the identification information, the parking position exclusively used for a disabled person.

8. The parking assistance system according to claim 4, wherein
   the moving vehicle information acquisition unit acquires information indicating whether or not a beginner driver rides in the vehicle as part of the identification information, and
   the control unit selects, when information indicating that the beginner driver rides in the vehicle is included in the identification information, one of two or more contiguous unoccupied parking positions.

9. The parking assistance system according to claim 4, wherein
   the moving vehicle information acquisition unit acquires information indicating whether or not a senior driver rides in the vehicle as part of the identification information, and
   the control unit selects, when information indicating that the senior driver rides in the vehicle is included in the identification information, a parking position adjacent to a gateway in the parking lot.

10. The parking assistance system according to claim 1, wherein
    the moving vehicle information acquisition unit and the projection unit are integrated with each other into one unit.

* * * * *